United States Patent
Wirz

(10) Patent No.: US 6,344,009 B1
(45) Date of Patent: Feb. 5, 2002

(54) BACKLASH-FREE GEAR

(75) Inventor: Walter Wirz, Pfaffikon (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/475,284

(22) Filed: Dec. 30, 1999

(30) Foreign Application Priority Data

Jan. 2, 1999 (DE) ......................... 199 00 010

(51) Int. Cl.$^7$ .......................... F16H 15/48; F16H 57/12
(52) U.S. Cl. .................. 475/185; 475/335; 475/347
(58) Field of Search ................... 475/183, 185, 475/334, 335, 346, 347, 348

(56) References Cited

U.S. PATENT DOCUMENTS

| | | | |
|---|---|---|---|
| 1,737,997 A | * 12/1929 | Garrard ................. | 475/183 |
| 1,811,921 A | * 6/1931 | Edmunds ................ | 475/183 |
| 1,985,645 A | 12/1934 | Rosner | |
| 3,401,580 A | * 9/1968 | Sigg ................... | 475/347 X |
| 3,817,125 A | * 6/1974 | Nakamura et al. ........ | 475/183 |
| 4,096,769 A | * 6/1978 | Horikiri et al. ........ | 475/347 X |
| 4,249,431 A | * 2/1981 | Pruvot et al. .......... | 475/348 X |
| 4,302,988 A | * 12/1981 | Takahashi et al. ....... | 475/114 |
| 4,465,162 A | * 8/1984 | Yokota ................. | 187/277 |
| 4,483,216 A | * 11/1984 | Takahashi et al. ...... | 475/183 X |
| 4,648,288 A | * 3/1987 | Kato et al. ............ | 475/183 |
| 4,938,087 A | * 7/1990 | Ragard ................ | 475/183 X |
| 5,021,035 A | * 6/1991 | Zhou .................. | 475/183 |
| 5,292,292 A | * 3/1994 | Heinrich et al. ........ | 475/346 X |
| 5,928,105 A | * 7/1999 | Taha et al. ........... | 475/346 X |

FOREIGN PATENT DOCUMENTS

| | | |
|---|---|---|
| DE | 68 06 397 | 11/1968 |
| DE | 1 650 741 | 12/1970 |
| DE | 29 19 120 A1 | 5/1979 |
| DE | 33 06 998 | 9/1983 |
| WO | WO96 30670 | 10/1996 |

\* cited by examiner

Primary Examiner—Charles A Marmor
Assistant Examiner—Ha Ho
(74) Attorney, Agent, or Firm—Sughrue Mion, PLLC

(57) ABSTRACT

The gear consists of a housing (12) to which a drive motor (10) is flanged. Its shaft (1) carries a sun wheel (2) on which multiple planets (3) roll off. The planets (3) are positioned on a planetary carrier (6) which is rigidly connected to the output shaft (9). The shaft (9) is supported in the housing (12) coaxial to the shaft (1). Mounted to the housing (12) is a flange (17) of a cup-shaped annular wheel (8). Its lower rim (16) has a running surface (7) inside, on which the planets (3) roll off. The diameter of the running surface (7) is smaller than the sum of the diameter of the sun wheel (2) and twice the diameter of the planets (3), so that the rim (16) is elastically deformed. The planets (3) are supported rigidly in the circumferential direction and flexibly in the radial direction on the planetary carrier (6). Through this implementation, a backlash-free, rotationally very rigid gear is obtained with which high torques can be transferred in smooth operation.

7 Claims, 2 Drawing Sheets

BACKLASH-FREE GEAR

BACKGROUND OF THE INVENTION

The invention relates to a backlash-free gearbox, for example, for a main spindle of a machine tool, preferably as a reduction gear for a work piece spindle of a gear hobbing or a gear grinding machine.

The machining of gears requires a very precise and complicated relative movement between tool and work piece which consist of several individual rotational and linear movements. In the continuous gear machining processes, besides the work piece, also the usually fast rotating tool has to be coordinated with respect to its angular position at every point in time with the rest of the relative movement proportions. While, in the past, complicated and highly precise mechanical gear trains were necessary to coordinate all of the various movements, today's control technology allows to drive every movement via a separate NC—axis-mostly equipped with a direct measuring system—with selectable coupling factors.

Because mainly the rotating angle precision of the workpiece during the machining, and thus the rotating angle precision of the workpiece spindle, is decisive for the quality of the finished toothing, drives are suitable for this only if they have, besides very smooth operation, a high rotational rigidity and are completely free of backlash. In the past, it has been attempted in a variety of ways to build drives considering these stringent requirements. For continuous hobbing machines, often low-backlash or backlash-free worm gears have been employed for this purpose, and in generating grinding machines often backlash-free spur gears or simple friction wheel gears. In machines, in which only small torques act on the workpiece spindle, also direct drives via backlash-free couplings can be found. Such a direct drive has many advantages: on the one hand, a high rotary stiffness free of backlash between motor and workpiece spindle is obtainable without much effort; on the other hand, the complexity of the design in comparison to the solution using gears is small.

If, however, larger gear wheels are machined on a machine, firstly, usually the required maximum speed of the workpiece is smaller and, secondly, the torque caused by the process forces are larger. For practical but mainly for technical reasons it is more advantageous in those cases to use a smaller motor coupled to a reduction gear for the drive of the workpiece spindle, than a direct drive with a correspondingly large motor. This is important from a control and technical point of view because, with a reduction gear, the torque acting on the workpiece spindle is reduced linear, the inertia of the workpiece, however, is reduced with the square of the gear reduction ratio on the motor shaft.

Worm gears are often not considered anymore because their gear reduction ratio is too large for the required ranges of speed of the workpiece spindle. Additionally, a really backlash-free worm gear produces a lot of friction which results in a low efficiency and generates undesirable heat at a sensitive location. Spur gears have the disadvantage, even if they have been produced with the highest care and precision, to generate disturbing tiny oscillations of the gear tooth meshing frequency on the workpiece spindle. While friction wheel gears have a very good transfer quality, they are usually limited in regard to torques transfer, because they often have only one single friction force transfer point. In addition, means for force compensation are necessary if the workpiece spindle bearings should not receive the axial or radial pressing force of the friction wheel.

SUMMARY OF THE INVENTION

It is the object of the present invention to disclose a backlash-free gear which has a smooth run, can transfer high torques and has a high rotary stiffness.

The present invention describes a workpiece drive which has the advantages of a friction wheel drive, namely the very smooth and shock-free rotational angle transfer, but does not have the disadvantages of a limited torque transfer and the necessity of a force compensation device and can also be built for a high rotary stiffness.

The drive according to the invention is, in terms of the design, a planetary gear in which the annular wheel is mounted rigidly to the housing and generates via a suitable deformation simultaneously the pressing force between the annular wheel and the planetary wheels on the one hand, and the planetary wheels and the sun wheel on the other hand.

BRIEF DESCRIPTION OF THE DRAWINGS

In the following, an embodiment of the invention is described with reference to the drawings, in which.

DETAILED DESCRIPTION OF THE PREFERRED EMBODIMENT

Figure 1:
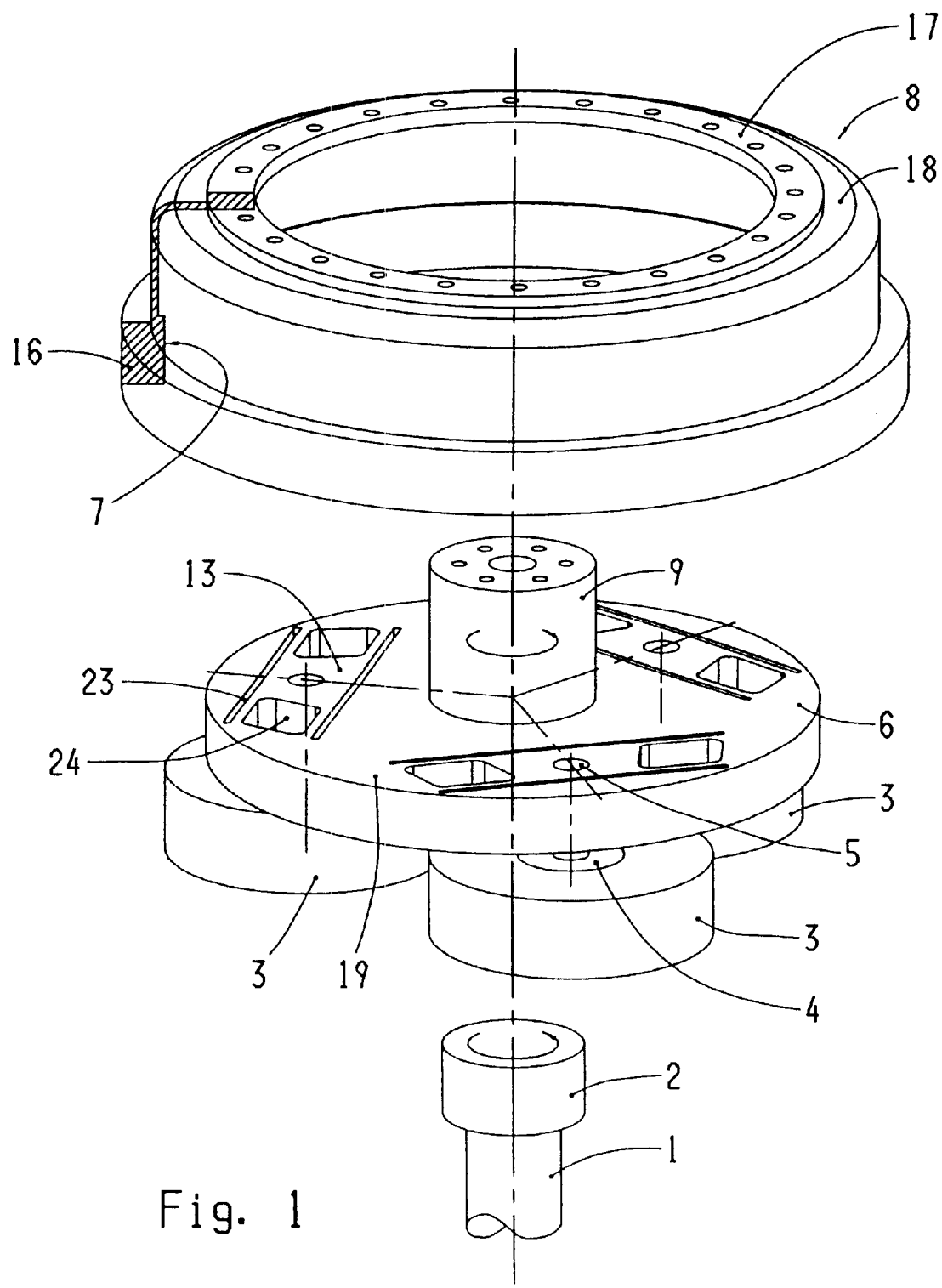
FIG. 1 shows an explosive view of the individual parts of the gear without the housing.

On the motor shaft 1, a sun wheel 2 is located with a cylindrical running surface 21 on which the planets 3 roll off. The running surfaces 22 of the planets 3 are machined at the circumference to be preferably slightly crowned, so that a definite contact area with the running surfaces 21 and 7 are generated. The planets 3 are connected via the bearing 4 and the bearing bolts 5 to the planetary carriers 6 and roll off on the inner surface 7 of the housing-tight annular wheel 8 which wheel has the shape of a pot, and which is cylindrical in the unloaded state. The number of possible planets is determined by the desired gear reduction ratio or by the ratio of the diameter of the annular wheel with that of the sun wheel. The planetary carrier 6 is directly connected to the workpiece spindle 9 which forms the output shaft.

Figure 2:
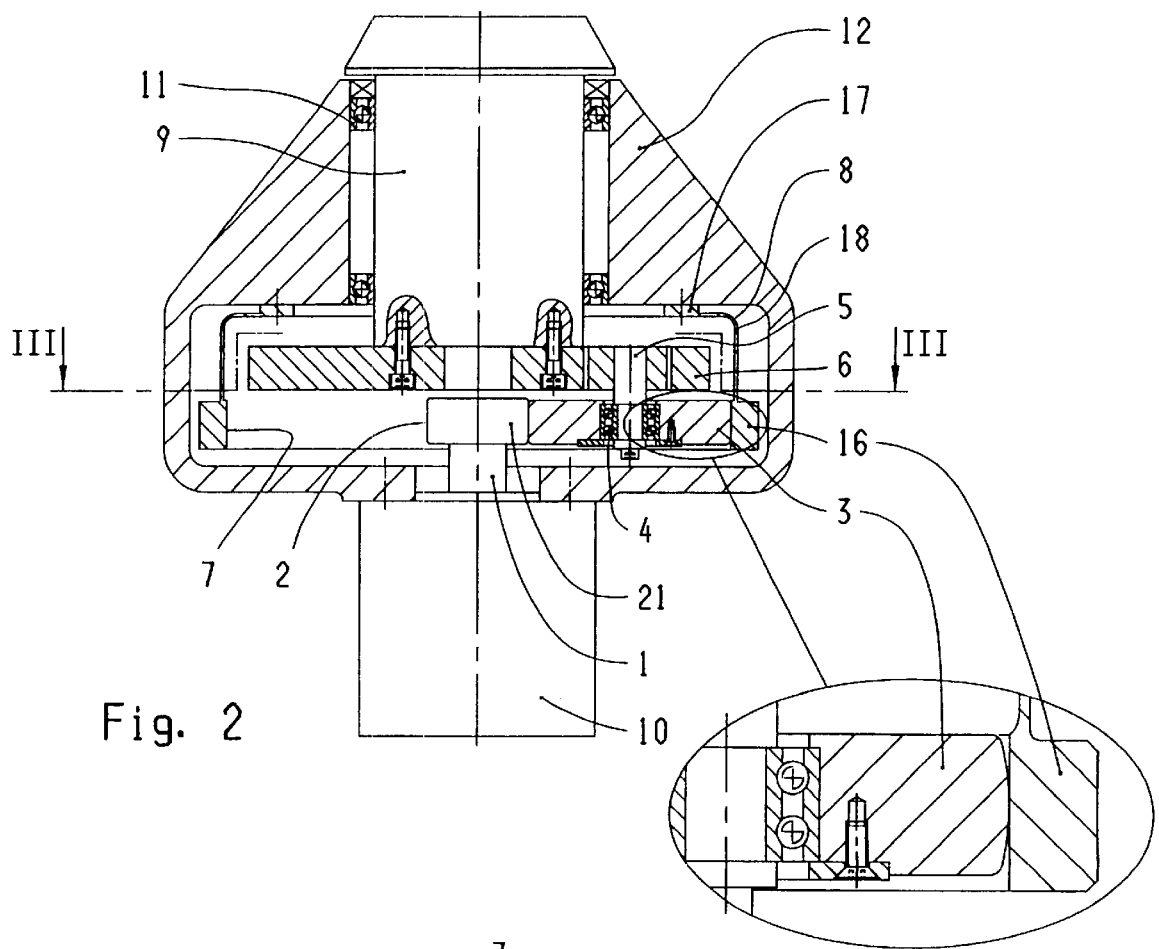
FIG. 2 shows a cross-section through the assembled gear.

FIG. 2 shows a cross-section of the assembled planetary gears. The driving motor 10 transfers its torque via the shaft 1 and the sun wheel 2 onto the planets 3. From the bearing bolts 5, the circumferential force is passed on to the planetary carrier 6 and thus directly on to the workpiece spindle 9. The workpiece spindle 9 is supported in the bearings 11 coaxial to the motor 10 in the housing 12.

Figure 3:
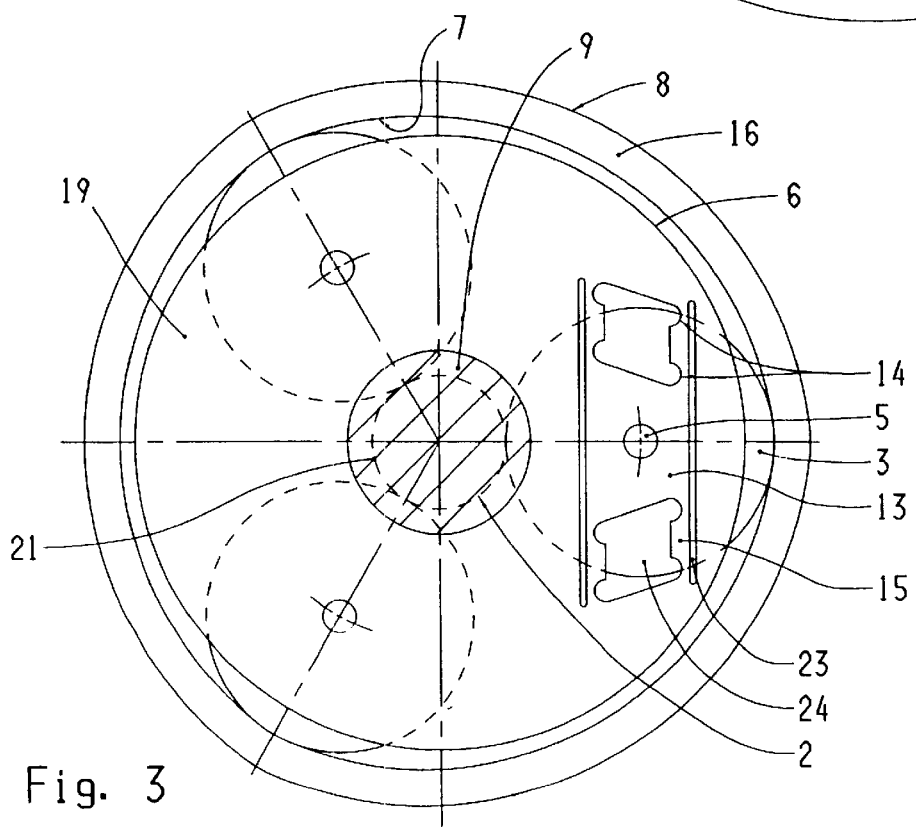
FIG. 3 shows a top view onto the planetary carrier with the non-circularity of the annular wheel drawn exaggeratedly for better understanding.

FIG. 3 shows a top view of the planetary carrier 6 of an embodiment with three planets 3. In the planetary carrier 6 consisting of one piece, planetary bolts 5 are held in one bearing carrier 13 each, which carrier is connected to the planetary carrier base body 19 via elastic zones 14 and struts 15. In FIG. 3, only one of the three bearing carriers 13 is illustrated. Both of the others are shaped identically. The struts 15 of each bearing carrier 13 are arranged parallel to one another, with all of them having the same length and being mirror-symmetrical to the common plane of the axes of the sun wheel 2 and the respective planet 3. The shape of bearing carrier 13 is trapezoidal. In this way it is achieved that both of the struts 15 facing the sun wheel 2 lie farther apart. Thus, a high rigidity about a radial axis is achieved.

The slits 23 and openings 24 necessary for the manufacturing of the shown structure of the bearing carriers 13, the struts 15 and the bending zones can be produced in different ways, for example, using laser or water jet, by spark erosion or by mechanical machining. The annular wheel 8 rests with its inner surface 7 on the planets 3.

For a largely slip-free transfer of the torque from the motor 10 to the workpiece spindle 9, a sufficient value of the pressing force is required between the planets 3 and the sun wheel 2 and the annular wheel 8. According to the invention, this pressing force is generated through an elastic deformation of the lower rim 16 of the annular wheel 8. This is machined in such a way that the diameter of its inner surface 7 is smaller than the circumference around the planetary wheels 3. The annular wheel 8 can thus surround the planets 3 with its inner surface 7 only in multi-corner-shaped deformed condition of the rim 16. In FIG. 2, for example, three planetary wheels 3 are illustrated; therefore, the rim 16 is slightly triangular in this case. The tendency of the rim 16 to take on its original round shape in the assembled condition, generates the necessary elastic force to bring the friction wheels into the necessary tight contact. With the dimensioning of the cross-section section of the rim 16 of the annular wheel 8 and the size of the forced unroundness, the pressing force can be varied largely and thus made to meet the requirements.

For a correct functioning of the planetary gearing, the annular wheel 8 has to be connected to the gearing housing 12 in a most rotationally rigid manner. To this end, it is mounted with its reinforced flange 17 onto the rigid housing 12. At this position, therefore, there cannot be any deformations for the annular wheel. To allow the rim 16 to be deformed to a triangular shape, it is connected to a pot-shaped, very thin-walled and flexible zone 18 with the flange 17. This form gives the rim 16 sufficient flexibility, despite the very high torsional rigidity relative to the housing 12.

With respect to the basic function of the gear, the radial pressure forces between the inner surface 7 of the annular wheel 8 and the planets 3 should be the same as the radial pressure between the planets and the sun wheel 2 because under torque load of the gear, the friction forces are equal in these points of contact. This can be achieved by rotationally rigid and backlash-free but radially flexible connection between the planets 3 and the planetary carrier 6. According to the invention, the problem is solved by a one-piece planetary carrier 6 which is formed such that the planetary axles 5 are held by a bearing carrier 13 which is connected elastically via the bending joints 14 and webs 15 in radial direction, however, very rigidly in circumferential direction to the base body 19 of the planetary carrier 6.

The described design allows, despite usual finishing tolerances for the sun wheel 2, the planets 3 and the running surface of the annular wheel 7, the production of a friction wheel gear which has the highest rotational rigidity, i.e., is completely back-lash free, and guarantees a precisely defined pressing force for the frictional contact zones, produces no traverse forces against the output shaft 9, and, with regard to the radius of the planetary axles, has twice as many frictional force transfer points as it has planets. The gearing operates very smoothly.

What is claimed is:

1. A backlash-free friction gear comprising a housing (12), an annular wheel (8) rotationally rigidly mounted to the housing (12), the annular wheel having a rim (16) which has an inner first running surface (7), said first running surface (7) being cylindrical in an unloaded state, a first shaft (9) rotationally supported in the housing (12) coaxial to the annular wheel (8), to which said first shaft a planetary carrier (6) is mounted, multiple planetary wheels (3) rotationally supported on the planetary carrier (6), a second shaft (1) rotationally mounted coaxial to the first shaft (9), onto which said second shaft a sun wheel (2) with a second cylindrical running surface (21) is mounted, wherein the planetary wheels (3) roll on the first and second cylindrical running surfaces (7, 21), wherein a diameter of the first cylindrical running surface (7) is smaller in the unassembled state than the sum of the diameter of the second cylindrical running surface (21) and the double of the diameter of the planetary wheels (3), wherein rotational axles (5) of the planetary wheels (3) are held rigidly and backlash-free free in the planetary carrier (6) in the circumferential direction of the planetary carrier (6) and flexibly in the radial direction, wherein the planetary axles (5) are rigidly connected to the planetary carrier via bending joints (14) in circumferential direction of the planetary carrier (6), and wherein each planetary axle (5) is arranged in a bearing carrier (13) which is connected at two opposite sides via two struts (15) each to a planetary carrier base body (19), wherein all said struts (15) of one and the same said bearing carrier (13) are parallel to one another.

2. The gear according to claim, 1, wherein each of the struts (15) is connected at both ends via elastically bending zones (14) to the base body (19) and to the respective bearing carrier (13).

3. The gear according to claim 1, wherein the base body (19), the struts (15) and the bearing carrier (13) are arranged in one piece.

4. The gear according to claim 1, wherein the bearing carrier (13) is trapezoidal in shape and all struts (15) are of equal length.

5. The gear according to claim 1, wherein the second shaft (1) is an input shaft connected to a motor (10) and the first shaft (9) is the output shaft of the gear.

6. The gear according to claim 1, wherein the annular wheel (8) has the shape of a pot with the rim (16) being elastic and being connected via an elastically bending intermediary area (18) to a rigidly mounting flange (17) which is mounted to the housing (12).

7. The gear according to claim 1, wherein the planetary wheels (3), or both of the running surfaces (7, 21), are crowned.

* * * * *